June 14, 1960  E. E. WHITE  2,940,329
VARIABLE SPEED DRIVE MECHANISM
Filed Oct. 8, 1958  2 Sheets-Sheet 1

Fig.1

INVENTOR
EFFIE E. WHITE
by: *[signature]*
ATTY.

June 14, 1960  E. E. WHITE  2,940,329
VARIABLE SPEED DRIVE MECHANISM
Filed Oct. 8, 1958  2 Sheets-Sheet 2
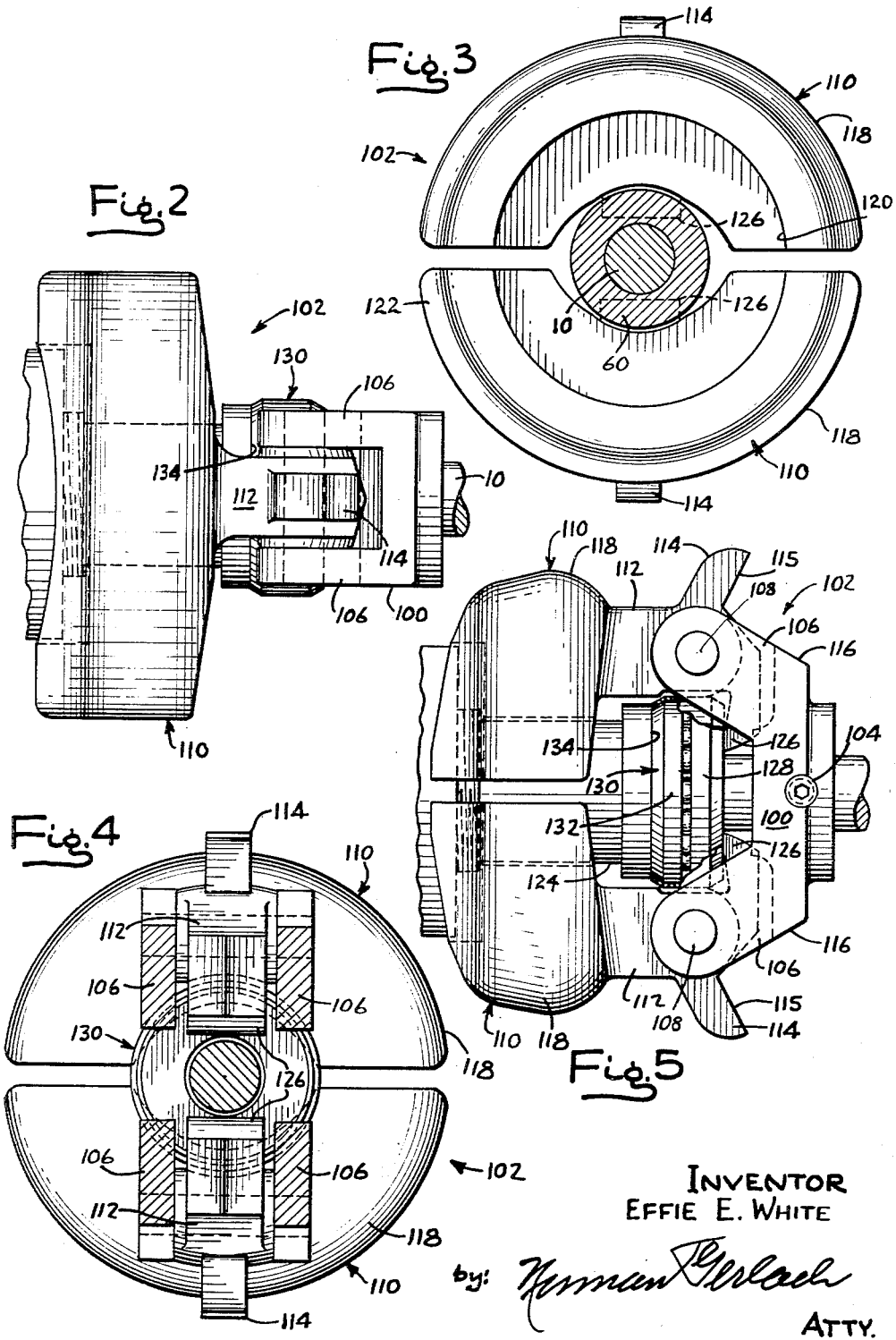
INVENTOR
EFFIE E. WHITE
by: Norman Gerlach
ATTY.

2,940,329

VARIABLE SPEED DRIVE MECHANISM

Effie E. White, 136 Buell Ave., Aurora, Ill.

Filed Oct. 8, 1958, Ser. No. 766,027

3 Claims. (Cl. 74—230.17)

The improved variable speed drive mechanism comprising the present invention has been designed for use primarily in connection with refrigeration apparatus for motor driven vehicles of the type shown and described in the patent to Eldon F. Miller, No. 2,910,840, granted on November 3, 1959 for Motor-driven Vehicles with Refrigerating Apparatus, wherein an automotive vehicle having a body provided with a refrigeration chamber for comestibles employs a refrigeration system of the condenser-compressor-evaporator type to cool the chamber and also employs a power take-off mechanism whereby the compressor and certain other instrumentalities, such as the fan for impelling air through the radiating coils of the condenser, are driven from the driving motor of the vehicle or, alternatively, are driven from an electric motor which may be energized with outside or power line current. When employed in this connection, the variable speed drive of the present invention is operatively interposed in the power take-off mechanism between the output shaft of the automotive transmission leading to the driving wheels and the input shaft of the refrigeration system compressor and may be so designed that it will translate the variable speed of rotation of the transmission output shaft throughout all of the range of speed changes of which the transmission is capable, as well as throughout all normal vehicle speeds on a highway, into substantially constant speed of rotation of the input shaft of the refrigeration apparatus.

The invention is capable of other uses however and the improved variable speed drive mechanism of the present invention may, with or without modification, be employed in connection with refrigeration systems other than the system specifically shown and described in the above-mentioned copending application, or, in fact, it may be employed as a speed change device or regulator for varying or stabilizing the speed of rotation of a driven shaft or member under the motivating control of a variable speed drive shaft, or member regardless of the use to which the speed change device may be put.

It is among the principal objects of the invention to provide a variable speed drive mechanism including a drive shaft and a driven shaft, the two shafts being operatively connected by a Reeves type belt and pulley connection including a split pulley on the drive shaft, together with novel means, operable under the control of a governor for effecting shifting movements of one of the split pulley sections to vary the effective driving diameter of the pulley.

Another object of the invention, in an apparatus of this character, is to provide a novel form of speed regulating governor having associated therewith a plurality of dynamically balanced governor weights which are mounted on and rotatable in unison with the drive shaft and which, when in their normal retracted position closely hug and individually partially surround the shaft upon which they are mounted so as to present an extremely small radial span, thus placing the center of mass of the weights close to the relative axis of rotation of the governor and reducing the retarding action of the governor to a minimum when the centrifugal governor weights are in their fully retracted positions so that a wider range of driving shaft speeds may be accommodated. Additionally, by permitting the governor weights to collapse upon the drive shaft in the manner briefly outlined above, a more compact governor structure is attained and a smaller governor and governor power train housing may be employed.

A still further object of the invention, in a variable speed drive mechanism of the character briefly outlined above, is to provide a control governor having centrifugal governor weights associated therewith which are extremely sensitive to control at the intended output shaft speed, yet which are reluctant to effect any governor control whatsoever at low speeds so that until such time as a predetermined governor speed, i.e., input shaft speed, has been attained, there will be no translation of movement between the input shaft and the output shaft of the mechanism. In carrying out this last mentioned object, it is contemplated that the governor weights shall be so designed that they initially resist displacement from their fully retracted or collapsed positions but develop an appreciable sensitivity to outward swing after initial displacement has commenced so that, thereafter, they will move rapidly toward their fully extended position and counteract any centripetal forces which may be exerted thereagainst by the adjusting mechanism associated therewith. By such an arrangement the control exerted on the governor mechanism as a whole is sharp in the narrow range of contemplated output shaft speeds.

A still further object of the invention is to provide a novel combination of a governor unit or assembly and a governor power train by means of which the centrifugal motion of a series of governor weights associated with the unit may be translated into longitudinal shifting movements of a thrust member for performing useful work, for example, effecting axial shifting movements of a movable pulley associated with a Reeves drive, together with means whereby the centripetal force acting upon the governor weights may be varied within very fine limits to regulate the displacements thereof and consequently regulate the amplitude of shifting movement of the thrust member within any given range of speed variations. By such an arrangement, when the governor assembly is associated operatively with a Reeves type pulley mechanism for speed change purposes, such regulation of the amplitude of displacement of the governor weights will serve to vary the variable output speed or rate of rotation of the output of the mechanism.

The provision of a variable speed drive mechanism which is extremely compact in its design; one which is comprised of a minimum number of parts and which therefore may be manufactured at a relatively low cost; one which is rugged and durable and which therefore is unlikely to get out of order; one which is capable of being easily assembled and disassembled for purposes of inspection of parts for replacement purposes or repair; one which is silent and smooth in its operation, one in which the centrifugal governor components thereof may operate effectively in any selected position thereof, i.e. as between a vertical and a horizontal positon; one wherein the adjusting means for regulating the centripetal force applied to the governor weights is self locking in any position thereof, and one which otherwise is well adapted to perform the services required of it are further desirable features which have been borne in mind in the production and development of the present invention.

Other objects and advantages of the invention, not at this time enumerated, will become more readily apparent as the following description ensues.

In the accompanying two sheets of drawings forming a part of this specification, a preferred embodiment of the invention has been shown.

In these drawings:

Fig. 1 is a sectional view taken substantially longitudinally and centrally through a speed change mechanism embodying the principles of the present invention.

Fig. 2 is an enlarged sectional view taken substantially along the line 2—2 of Fig. 1;

Fig. 3 is an enlarged sectional view taken substantially along the line 3—3 of Fig. 1;

Fig. 4 is an enlarged sectional view taken substantially along the line 4—4 of Fig. 1, and Fig. 5 is a fragmentary enlarged side elevational view of a governor assembly employed in connection with the speed change mechanism and showing the same operatively mounted on the variable speed power input shaft of the speed change mechanism.

Referring now to the drawings in detail, a typical installation for effecting a speed variation in the rotational speed of a driven shaft in accordance with speed changes in the rate of rotation of a driving shaft is shown in Fig. 1. Here it may be considered that the shaft 10 constitutes the drive shaft and that the shaft 16 constitutes the driven shaft, although it is obvious that, if desired, power may be applied to the shaft 16 to effect commensurate changes in the rate of rotation of the shaft 10 according to speed variations of the shaft 16.

In addition to constituting the drive shaft, the shaft 10 also constitutes the armature shaft of the motor 12 or at least that portion of the armature shaft which projects outwardly from the right hand end of the generally cylindrical motor housing 14. The shaft 10 also projects axially through the housing and on the side of the housing remote from the speed change mechanism, the shaft is operatively in driving relationship to the output shaft. The drive shaft 10 is operatively connected by the speed change mecahnism of the present invention to an output shaft 16. The output shaft 16 carries a pulley 18 which is operatively connected by a belt 19 which may lead to the input shaft of any desired mechanism or apparatus.

The above described environment for the present speed change mechanism is purely exemplary and it will be understood that the mechanism may be employed in other environments. Thus, in the ensuing description of the speed change mechanism per se, the variable speed shaft 10 will be referred to as the drive shaft of the mechanism, while the variable speed shaft 16 will be referred to as the driven shaft.

Still referring to Fig. 1, in the illustrated environment of the invention the drive shaft 10 and the driven shaft 16 are both effectively rotatably journalled in a stationary frame member 20 which may constitute a portion of the supporting structure for the refrigeration apparatus. The shaft 16 projects through the frame member 20 and is rotatably carried in antifriction bearings 22. The shaft 10 is spaced from and extends parallel to the shaft 16 and likewise projects through the frame member 20. The medial regions of the shaft 10 pass through an opening 24 provided in a thickened boss or hub-like projection 26 formed on the frame member 20 and the distal end of the shaft 10 being rotatably carried in an antifriction bushing 28 mounted in a socket 30 provided in a cap member 32 secured by screws 34 to the crown portion of a bell housing 36. The bell housing 36 is provided with an annular flange 38 which is secured by clamping screws 39 to the boss 26 and, when in position on the frame member 20 serves to enclose certain operative centrifugal governor mecahnism which is mounted on the shaft 10 and the nature and function of which will be made clear presently.

On the side of the frame member 20 remote from the bell housing 36, the drive shaft 10 carries a split pulley arrangement designated in its entirety at 40 and including an axially fixed section 42 and an axially shiftable section 44, the former being keyed as at 46 to the drive shaft 10 and bearing against a shoulder 48 on the shaft, and the latter being provided with an internal bushing 50 which is axially slidable on the shaft 10 so that the pulley section 44 as a whole is movable toward and away from the pulley section 42. A drive pin 52 extends between the two pulley sections 42 and 44 and serves drivingly to connect these pulley sections for rotation in unison.

The right hand end of the pulley section 44 as viewed in Fig. 1 is formed with an annular recess 54 in which recess there is seated an antifriction thrust bearing assembly 56 which surrounds the shaft 10 and bears against a shoulder 58 provided on a thrust sleeve 60 which is slidably disposed on the drive shaft 10 and which is restrained against rotation relative to the frame member 20 by instrumentalities which will be described subsequenlty. Thus it will be seen that upon axial shifting movement of the thrust sleeve 60 to the left as viewed in Fig. 1, the movable pulley section 44 will, through the medium of the shoulder 58 and thrust bearing 56, be forced toward the axially fixed pulley section 42. The bearing assembly 56 is retained within the recess 54 by means of a removable retaining ring 61.

The driven shaft 16 has mounted thereon a split reaction pulley 62 including an axially fixed pulley section 64 and an axially slidable pulley section 66, the latter being pinned as at 68 to the shaft 16. The left hand end of the shaft 16 as viewed in Fig. 1 is threaded as at 70 and receives thereover a nut 72 and washer 74 while a compression spring 76 surrounds the shaft 16 and bears at one end against the washer 74 and at its other end against the end of a hub portion 78 provided on the pulley 64. The two split pulley assemblies 40 and 62 are in approximate transversal alignment on the respective shafts 10 and 16 and a drive belt 82 passes over the two pulleys. The operative inside surfaces of the pulley flanges are inclined relative to the axes of their respective shafts at an angle of approximately 11° and the edge regions 84 of the belt 82 are correspondingly beveled.

The maximum and minimum effective diameters of the inside sloping surfaces of the pulley flanges and the continuous extent of the belt 82 are such that the nut 72 may be ajusted so that the spring 76 exerts the proper degree of thrust upon the pulley section 64 whereby the sides of the belt are frictionally engaged by the sloping faces of the two pulley sections 64 and 66 with the necessary degree of frictional engagement that "opening" and "closing" movements of the two pulley assemblies 40 and 62 will take place in reverse relationship whereby, as the pulley section 44 is forcibly moved toward the pulley section 42 to increase the effective diameter of the pulley assembly 40, the tension exerted by the belt 82 on the pulley assembly 62 will cause the pulley section 64 to be moved against the action of the spring 76 away from the pulley section 66 to decrease the effective diameter of the pulley assembly 62, all in the manner of conventional Reeves speed-change pulley mechanisms.

The previously mentioned thrust sleeve 60 projects through a central opening 90 in the hub portion or boss 26 and is provided with a medial threaded region 92 which threadedly receives thereover an adjusting nut 94. A compression spring 96 bears at one end against the nut 94 and at its other end against the boss 26, the latter constituting a fixed reaction member for the spring so that the thrust sleeve 60 is normally urged to the right as viewed in Fig. 1 and in a direction which permits the axially shiftable pulley section 44 to assume its extreme position of maximum displacement from the fixed pulley section 42.

Referring now to Figs. 2 to 5 inclusive, the outermost or distal end region of the drive shaft 10 has mounted thereon a spider-like mounting hub or collar 100 which constitutes one element of a centrifugal governor assembly designated in its entirety at 102, the hub 100 being pinned as at 104 (Fig. 5) against relative rotation and axial shifting relative to the shaft 10. The mounting hub 100 is provided with two diametrically opposed pairs of forwardly and outwardly inclined ears 106, the ears of each pair being identical in their shape and dimensional characteristics.

Pivotally supported between each pair of ears 106 on a pivot pin 108 is a centrifugal governor weight 110, the two weights being capable of mutual contraction and expansion toward and away from longitudinal axis of the drive shaft 10 in the usual manner of centrifugal weights under the influence of centrifugal force which is generated upon rotation of the shaft and which is opposed by the centripetal force offered to the weights 110 by the expansion spring 96 as will be set forth presently. Each weight includes a relatively narrow flat-sided stem portion 112 from which there projects outwardly a rearwardly inclined limit stop finger 114 having a straight edge 115 formed thereon and designed for engagement with the frusto-conical rear face 116 of the hub 100 to limit the extent of outward swinging movement of which the weights 110 are capable, one of the weights being illustrated in dotted lines in Fig. 5 when in such extreme outward position.

The distal or free end of each centrifugal weight 110 is formed with an arcuate head 118 presenting a semi-cylindrical inside surface 120 of relatively small radius of curvature and a semi-cylindrical outside surface 122 of appreciably greater radius of curvature and concentric with the inside surface 120 (Figs. 3 and 4).

As best seen in Fig. 1 the thrust sleeve 60 is formed with a relatively wide annular groove 124 thereunder in the vicinity of the governor assembly 102, this groove affording a clearance region to permit close nesting of the governor weights 110 against the sleeve 60. It is to be noted that in the retracted or closed position of the governor weights, the cylindrical inner surfaces 120 thereof project nearly to a transverse radial plane passing diametrically through the drive shaft so that the centrifugal forces acting upon the weights when low shaft speeds are encountered is slight.

Referring now to Fig. 5, each governor weight 110 is formed with an inwardly projecting finger 126 designed for engagement with the forward race 128 of a thrust bearing assembly 130, the rear race 132 of the assembly bearing against the forward end of the thrust sleeve 60. The bearing assembly 130 surrounds the drive shaft 10 and translates the swinging movements of the fingers 126 into axial shifting movements of the thrust sleeve 60, assisted or opposed by the action of the spring 96 as the case may be.

In the operation of the above-described variable speed drive mechanism, the adjusting nut 94 is adjusted axially of the threaded portion 92 of the drive shaft 10 to place a predetermined degree of initial compression upon the spring 96 commensurate with the desired speed at which the driven shaft 16 is to be driven. As the drive shaft 10 rotates, under the influence of the electric motor 12 after a predetemined range of comparatively low speed acceleration of the drive shaft 10 has been consummated, the centrifugal forces acting upon the weights 110 cause the latter to "fly out" and move away from the axis of the shaft 10, whereupon the centrifugal weights, acting in the manner of bell crank levers, will, through the medium of the fingers 126 and thrust bearing 130, force the thrust sleeve 60 rearwardly or to the left as viewed in Fig. 1. Such shifting movement of the thrust sleeve 60 will be resisted by the compressional force offered by the spring 96 and a centripetal counter-force will be exerted upon the weights 110 through the thrust bearing 130 and fingers 126 to limit the extent of outward movement of the weights to a degree commensurate with the speed of rotation of the drive shaft 10. The thrust sleeve 60 will be held against rotation due to its frictional contact with the forward end of the spring 96 and this nonrotating thrust sleeve will apply rearward thrust to the axially shiftable pulley section 42 of the split driving pulley assembly 40 through the thrust bearing 58. As the pulley section 44 moves toward the axially fixed pulley section 42, the belt 82 will be compressed between the opposed inclined or frusto-conical faces of the two pulleys and the belt 82 will move outwardly toward the peripheral regions of the pulley assembly, thus increasing the effective driving diameter of the pulley assembly 40 as a whole. At the same time, the belt 82 will exert a degree of "pull" upon the pulley assembly 62 so that the extent of the pressure offered by the belt to the inclined opposed friction surfaces of the pulley sections 64 and 66 will force the axially shiftable pulley section 66 away from the fixed pulley section 64 to thus decrease the effective diameter of the pulley assembly 62 as a whole. The speed of rotation of the driven shaft 16 will thus be commensurate with the diameter differential offered by the two pulley assemblies 40 and 62 to the common connection belt 82.

The instrumentalities which are enclosed within the bell housing 36 may operate with a minimum amount of lubrication or, alternatively, these instrumentalities may be substantially permanently lubricated by packing the bell housing with a lubricant of the proper viscosity to not interfere with effective governor action. In either event, in order that a film of lubricant may be maintained between the thrust sleeve 60 and the drive shaft 10 which it intimately surrounds, one or more lubricant passages 140 are provided in the medial regions of the thrust sleeve and these passages communicate with an internal groove 142 provided in the bore of the thrust sleeve. This groove, in combination with the cylindrical outer surface of the drive shaft 10, provides in effect a lubricant reservoir for retaining a quantity of the lubricant in intimate contact with the opposed meeting faces of the thrust sleeve 60 and of the drive shaft 10.

It is to be noted that since the rotatable drive shaft, in the illustrated embodiment of the invention, constitutes the armature shaft of the electric motor 12, the shaft is maintained in axial alignment with the motor housing so that when the bell housing 36 is removed for lubrication of the enclosed instrumentalities or adjustment of the nut 94, the shaft 10 will remain rigidly supported so that replacement of the bell housing by alignment of the bushing 28 and socket 30 with the end of the shaft 10 may readily be erected.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. In a speed change mechanism of the character described, in combination, a stationary support, a shaft rotatable relative to said support, a split pulley on said shaft including an axially fixed pulley section and an axially slidable pulley section, said pulley sections defining therebetween a variable width V-groove for reception therein of a belt whereby the effective diameter of the pulley is a function of the groove width, means connecting said pulley sections and shaft for conjoint rotation in unison, a collar fixedly mounted on the shaft and spaced axially from said axially slidable pulley section, a thrust sleeve axially slidable on said shaft between said axially slidable pulley section and the collar, a centrifugal governor weight pivoted at one end to said collar for swinging movements toward and away from the axis of the shaft, a connection between said thrust sleeve and weight for translating outward swinging movement of the weight into axial shifting movement of the sleeve to effectively force the latter into engagement with the axially slidable pulley section to in turn move the latter pulley section relative to the axially fixed pulley section, and spring means normally urging said thrust sleeve in a direction away from said axially slidable pulley section, said spring means comprising a compression spring surrounding said sleeve and bearing at one end against said stationary support, a portion of said sleeve being exteriorly threaded, and an adjusting nut on said threaded portion of the sleeve, the other end of said compression spring bearing against said adjusting nut.

2. In a speed change mechanism of the character described, in combination, a stationary support, a shaft rotatable relative to said support, a split pulley on said shaft including an axially fixed pulley section and an axially slidable pulley section, said pulley sections defining therebetween a variable width V-groove for reception therein of a belt whereby the effective diameter of the pulley is a function of the groove width, means connecting said pulley sections and shaft for conjoint rotation in unison, a collar fixedly mounted on the shaft and spaced axially from said axially slidable pulley section, a thrust sleeve axially slidable on said shaft between said axially slidable pulley section and the collar, a centrifugal governor weight pivoted at one end to said collar for swinging movements toward and away from the axis of said shaft, a first finger on said weight effectively engageable with one end of the thrust sleeve for translating outward swinging movements of the weight into axial sliding movements of the thrust sleeve to force the other end of the sleeve into effective engagement with the movable pulley section and, in turn, cause the latter pulley section to be moved relative to the fixed pulley section to vary the effective width of the V-groove, the distal end of said weight being formed with an enlarged head presenting an arcuate concave inner surface movable into a position of close proximity to the thrust sleeve when the weight is at rest to locate the center of mass of the weight as a whole close to the axis of rotation of the shaft, spring means normally urging the thrust sleeve in a direction away from said axially slidable pulley section, said spring means comprising a compression spring surrounding said sleeve and bearing at one end against said stationary support, a portion of said sleeve being exteriorly threaded, an adjusting nut on said threaded portion of the sleeve, the other end of said compression spring bearing against said adjusting nut, and a second finger on said centrifugal weight and engageable with a portion of said collar for limiting the extent of outward swinging movement of the weight away from the axis of said shaft.

3. In a speed change mechanism of the character described, the combination set forth in claim 2 including, additionally, an antifriction bearing interposed between said thrust sleeve and said first finger, and a second bearing interposed between said thrust sleeve and movable pulley section.

References Cited in the file of this patent

UNITED STATES PATENTS

| | | |
|---|---|---|
| 2,600,416 | Millard | June 17, 1952 |
| 2,612,054 | Davis | Sept. 30, 1952 |
| 2,639,134 | Winslow | May 19, 1953 |
| 2,651,210 | Clark | Sept. 8, 1953 |
| 2,757,253 | Gaubatz | July 31, 1956 |